United States Patent [19]
Grieff et al.

[11] Patent Number: 5,635,739
[45] Date of Patent: Jun. 3, 1997

[54] MICROMECHANICAL ANGULAR ACCELEROMETER WITH AUXILIARY LINEAR ACCELEROMETER

[75] Inventors: Paul Grieff, Wayland; Burton Boxenhorn, Chestnut Hill; Marc S. Weinberg, Needham, all of Mass.

[73] Assignee: The Charles Stark Draper Laboratory, Inc., Cambridge, Mass.

[21] Appl. No.: 428,531

[22] Filed: Apr. 25, 1995

Related U.S. Application Data

[63] Continuation of Ser. No. 103,896, Aug. 6, 1993, Pat. No. 5,473,945, which is a continuation-in-part of Ser. No. 904,211, Jun. 25, 1992, abandoned, which is a continuation-in-part of Ser. No. 528,812, May 23, 1990, Pat. No. 5,126,812, which is a continuation-in-part of Ser. No. 479,854, Feb. 14, 1990, Pat. No. 5,195,371.

[51] Int. Cl.⁶ .................................. H01L 29/82
[52] U.S. Cl. .................. 257/254; 257/417; 257/418; 257/420; 73/514.22; 73/514.23; 73/514.24; 73/514.36; 73/514.37; 73/DIG. 1
[58] Field of Search .................. 257/418, 420, 257/417, 254; 73/514.22, 514.23, 514.24, 514.36, 514.37, DIG. 1

[56] References Cited

U.S. PATENT DOCUMENTS

| Re. 32,931 | 5/1989 | Staudte | 73/505 |
|---|---|---|---|
| Re. 33,479 | 12/1990 | Juptner et al. | 73/505 |
| 3,053,095 | 9/1962 | Koril et al. | 73/504 |

(List continued on next page.)

FOREIGN PATENT DOCUMENTS

| 55-121728 | 9/1980 | Japan . | |
| 58-136125 | 8/1983 | Japan . | |
| 59-037722 | 3/1984 | Japan . | |
| 59-158566 | 9/1984 | Japan | H01L 29/84 |
| 61-144576 | 7/1986 | Japan | G01P 15/09 |
| 62-071256 | 8/1987 | Japan | H01L 27/06 |
| 62-221164 | 9/1987 | Japan | H01L 29/84 |
| 63-169078 | 7/1988 | Japan | H01L 29/84 |
| 2183040 | 5/1987 | United Kingdom | G01F 15/02 |
| 92/01941 | 2/1992 | WIPO | G01P 9/04 |
| 93/05401 | 3/1993 | WIPO | G01P 9/04 |

OTHER PUBLICATIONS

Barth, P. W. et al., "A Monolithic Silicon Accelerometer With Integral Air Damping and Overrange Protection", 1988 IEEE, pp. 35–38.

Boxenhorn, B. et al., "Micromechanical Inertial Guidance System and its Application", Fourteenth Biennial Guidance Test Symposium, vol. 1, Oct. 3–5, 1989, pp. 113–131.

Howe, R. et al., "Silicon Micromechanics: Sensors and Actuators On a Chip", IEEE Spectrum, Jul. 1990, pp. 29–35.

Moskalik, L., "Tensometric Accelerometers with Overload Protection", Meas. Tech. (USA), vol. 22, No. 12, Dec. 1979 (publ. May 1980), pp. 1469–1471.

Petersen, K.E. et al., "Micromechanical Accelerometer Integrated with MOS Detection Circuitry", IEEE, vol. ED-29, No. 1 (Jan. 1982), pp. 23–27.

(List continued on next page.)

*Primary Examiner*—William Mintel
*Attorney, Agent, or Firm*—Weingarten, Schurgin, Gagnebin & Hayes LLP

[57] ABSTRACT

A micromechanical accelerometer comprises a mass of monocrystalline silicon in which a substantially symmetrical plate attached to a silicon frame by flexible linkages is produced by selective etching. The plate has a plurality of apertures patterned and etched therethrough to speed further etching and freeing of the plate and flexible linkages, suspending them above a void etched beneath. The plate is capable of limited motion about an axis created by the flexible linkages. An accelerometer comprised of a substantially symmetrical, linkage supported plate configuration is implemented as an angular accelerometer paired with an auxiliary linear accelerometer, which is used to compensate for the linear sensitivity of the angular sensor, to achieve an instrument that is insensitive to linear acceleration and responds to angular acceleration.

2 Claims, 11 Drawing Sheets

U.S. PATENT DOCUMENTS

| | | | |
|---|---|---|---|
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 3,974,699 | 8/1976 | Morris et al. | 73/570 |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,311,046 | 1/1982 | Pittman | 73/570 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 5/1984 | Ochiai | 310/312 |
| 4,457,173 | 7/1984 | Hunter | 73/570 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,507,705 | 3/1985 | Hoshino | 73/DIG. 1 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Marhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/905 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,674,331 | 6/1987 | Watson | 73/505 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,761,743 | 8/1988 | Wittke | 364/484 |
| 4,764,244 | 8/1988 | Chitt et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,815,472 | 3/1989 | Wise et al. | 128/675 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,881,410 | 11/1989 | Wise et al. | 73/724 |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,006,487 | 4/1991 | Stokes | 73/514.23 X |
| 5,013,396 | 5/1991 | Wise et al. | 156/628 |
| 5,016,072 | 5/1991 | Greiff | 357/26 |
| 5,025,346 | 6/1991 | Tang | 361/283 |
| 5,038,613 | 8/1991 | Takenaka et al. | 73/510 |
| 5,055,838 | 10/1991 | Wise et al. | 340/870 |
| 5,060,039 | 10/1991 | Weinberg et al. | 357/26 |
| 5,065,626 | 11/1991 | Hanson | 73/514.23 X |
| 5,090,809 | 2/1992 | Ferrar | 356/350 |
| 5,094,537 | 3/1992 | Karpinski, Jr. | 356/350 |
| 5,126,812 | 6/1992 | Greiff | 357/25 |
| 5,138,883 | 8/1992 | Paquet et al. | 73/504 |
| 5,195,371 | 3/1993 | Greiff | 73/505 |
| 5,203,208 | 4/1993 | Bernstein | 73/505 |
| 5,205,171 | 4/1993 | O'Brien et al. | 73/517 B |
| 5,216,490 | 6/1993 | Greiff et al. | 73/517 R |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |
| 5,408,112 | 4/1995 | Tai et al. | 73/514.36 X |
| 5,507,911 | 4/1996 | Greiff | 73/514.23 X |

OTHER PUBLICATIONS

Corey, Victor B., "Multi–Axis Cluster of Single Axis Accelerometers with Coincident Centers of Angular Motion Insensitivity", pp. 25.1–25.17, Mar. 23–26, 1970, Int'l Aerospace Instrumentation Symp.

Boxenhorn, B., et al., "An Electrostatically Rebalanced Micromechanical Accelerometer," AIAA Guidance, Navigation and Control Conference, Boston, Aug. 14–16, 1989, pp. 118–122.

Boxenhorn, B., et al., "Monolithic Silicon Accelerometer," *Transducers '89*, Jun 25–30, 1989, pp. 273–277.

Boxenhorn, B., et al., "A Vibratory Micromechanical Gyroscope," AIAA Guidance, Navigation and Control Conference, Minneapolis, Aug. 15–17, 1988, pp. 1033–1040.

Nakamura, M., et al., "Novel Electrochemical Micro–Machining and Its Application for Semiconductor Acceleration Sensor IC," *Digest of Technical Papers* (1987) Institute of Electrical Engineers of Japan, pp. 112–115.

Petersen, Kurt E., et al., "Silicon as a Mechanical Material," *Proceedings of the IEEE*, vol. 70, No. 5, May 1982, pp. 420–457.

"Quartz Rate Sensor Replaces Gyros," *Defense Electronics,* Nov. 1984, p. 177.

Rosen, Jerome, "Machining In the Micro Domain," *Mechanical Engineering,* Mar. 1989, pp. 40–46.

Bryzek, Janusz et al., "Micromachines on the March," IEEE Spectrum, May 1994, pp. 20–31.

IEEE Robotics & Automation Soc. in coop. w/ASME Dynamic Systems & Control Div., "Micro Electro Mechanical Systems, An Investigation of Micro Structures, Sensors, Actuators, Machines and Systems," IEEE Cat. #93CH3265-6, Library of Congress #92–56273, Ft. Lauderdale, FL, Feb. 7–10, 1993.

MICROMECHANICAL ANGULAR ACCELEROMETER WITH AUXILIARY LINEAR ACCELEROMETER

CROSS REFERENCE TO RELATED APPLICATIONS

The present application is a continuation of U.S. patent application Ser. No. 08/103,896, filed Aug. 6, 1993, now U.S. Pat. No. 5,473,945, which is a continuation-in-part of Ser. No. 07/904,211, filed Jun. 25, 1992, entitled MONOLITHIC MICROMECHANICAL ACCELEROMETER, now abandoned which is a continuation-in-part of application Ser. No. 07/528,051, filed May 23, 1990, entitled MONOLITHIC MICROMECHANICAL ACCELEROMETER, Issued Jun. 30, 1992 as U.S. Pat. No. 5,126,812, which is a continuation-in-part of commonly assigned U.S. application Ser. No. 07/479,854, filed Feb. 14, 1990, entitled METHOD AND APPARATUS FOR SEMICONDUCTOR CHIP TRANSDUCER issued Mar. 23, 1993 as U.S. Pat. No. 5,195,371.

FIELD AND BACKGROUND OF THE INVENTION

The present invention relates to accelerometers, in particular to micromechanical accelerometers.

Semiconductor materials such as mono and polycrystalline silicon, and semiconductor mass production fabrication techniques have been used to produce micromechanical accelerometers, as in U.S. Pat. No. 4,483,194. More sophisticated devices employ more advanced technology to yield monolithic micromechanical accelerometers, as in U.S. Pat. Nos. 4,805,456 and 4,851,080.

Advances in micromechanical transducer technology are described in Applicant's co-pending, commonly assigned U.S. patent application Ser. No. 07/372,653 entitled BRIDGE ELECTRODES; U.S. patent application Ser. No. 07/373,032 entitled RESTRAINTS FOR MICROMECHANICAL DEVICES; U.S. patent application Ser. No. 07/560,374, filed Jul. 30, 1990, entitled MOTION RESTRAINTS FOR MICROMECHANICAL DEVICES, Issued May 12, 1992 as U.S. Pat. No. 5,111,693; U.S. patent application Ser. No. 07/470,938, filed Jan. 26, 1990, entitled MICROMECHANICAL DEVICE WITH A TRIMMABLE RESONANT FREQUENCY STRUCTURE AND METHOD OF TRIMMING SAME Issued Sep. 1, 1992 as U.S. Pat. No. 5,144,184; and U.S. patent application Ser. No. 07/493,327, filed Mar. 14, 1990 entitled SEMICONDUCTOR CHIP GYROSCOPIC TRANSDUCER Issued May 14, 1991 as U.S. Pat. No. 5,016,172, all of which are incorporated herein by reference.

The present invention is concerned with application of such advances specifically to accelerometers and further advancement of monolithic micromechanical accelerometers.

SUMMARY OF THE INVENTION

A micromechanical accelerometer is disclosed comprising a mass of monocrystalline silicon in which a substantially symmetrical plate attached to a silicon frame by flexible linkages is produced by selective etching. The plate has a plurality of apertures patterned and etched therethrough to speed further etching and freeing of the plate and flexible linkages, suspending them above a void etched beneath. Additional apertures may be introduced to control damping in gaseous atmospheres. The plate has a weight disposed thereon near an end remote from the flexible linkages. The plate is capable of limited motion about an axis created by the flexible linkages. Stop means limit motion of the plate about the axis. Strain relief tension beams are provided to relieve stress induced by boron diffusion necessary to provide etch stopping and the tension beams are trimmable in a manner which permits tuning of the resonant frequency of the plate. Grooves or depressions are provided in the flexible linkages to resist bending or buckling without increasing torsional stiffness. The plate and flexible linkages are electrically isolated from the silicon mass and frame by dielectric or P-N junction isolation. Integral P-N junction electrodes and surface bridging electrodes may be used to provide top to bottom symmetry in torquing and sensing of the plate while maintaining isolation and monolithic construction. Bias and readout circuitry used to sense and torque the plate may be provided integrally with the plate and formed during plate processing.

In alternative embodiments, a substantially symmetrical, linkage supported plate configuration is implemented as an angular accelerometer paired with an auxiliary linear accelerometer, which is used to compensate for the linear sensitivity of the angular sensor, to achieve an instrument that is insensitive to linear acceleration and responds to angular acceleration. The micromechanical devices have enhanced matching of device characteristics as the angular and linear devices are both fabricated from the same semiconductor substrate using micromechanical fabrication techniques.

DESCRIPTION OF THE DRAWING

The invention will be more fully understood from the following detailed description of an illustrative embodiment taken in conjunction with the accompanying drawing in which.

DETAILED DESCRIPTION OF THE INVENTION

Figure 1:
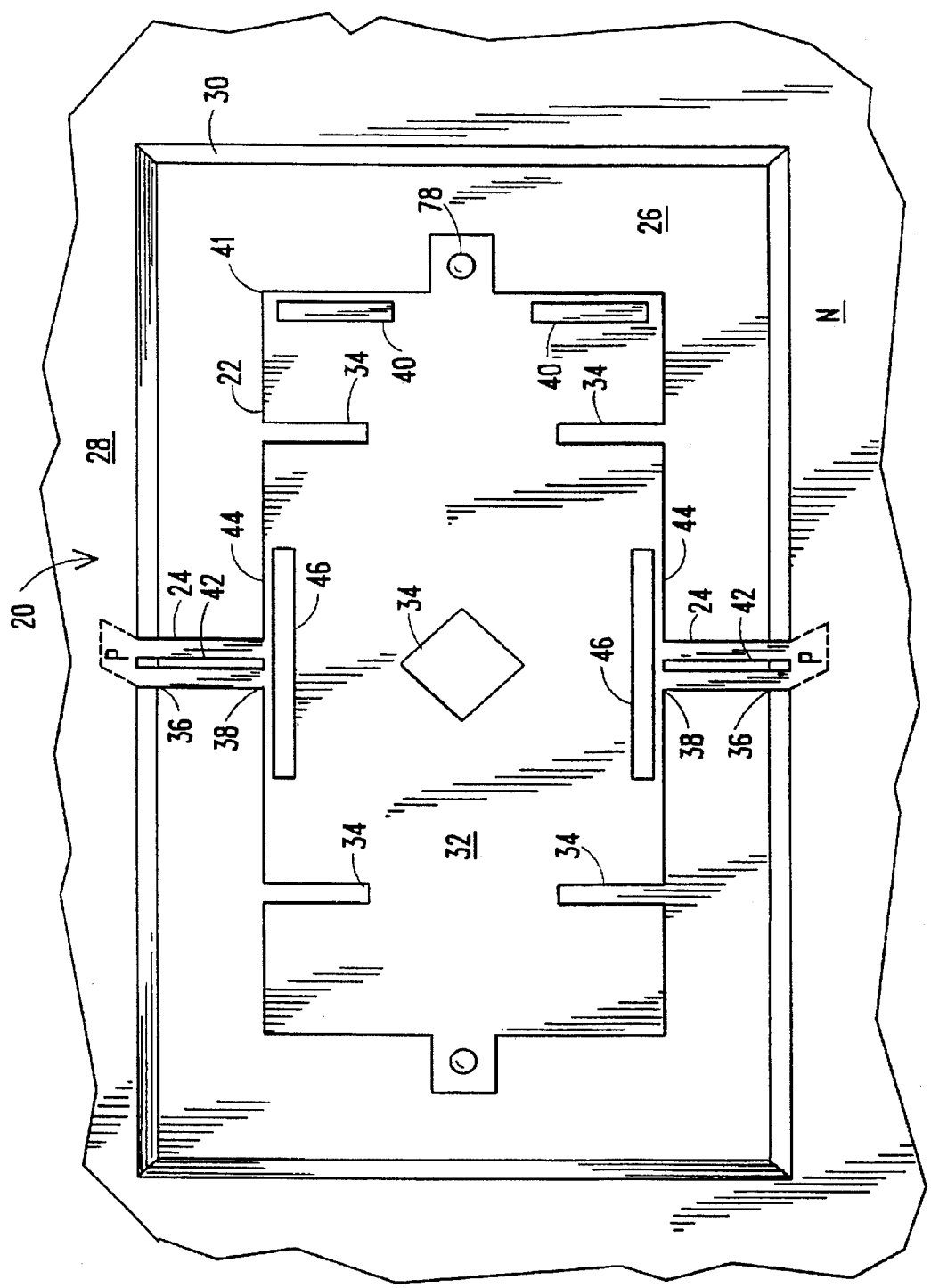
FIG. 1 is a top view of a micromechanical accelerometer according to the invention.
Figure 2:
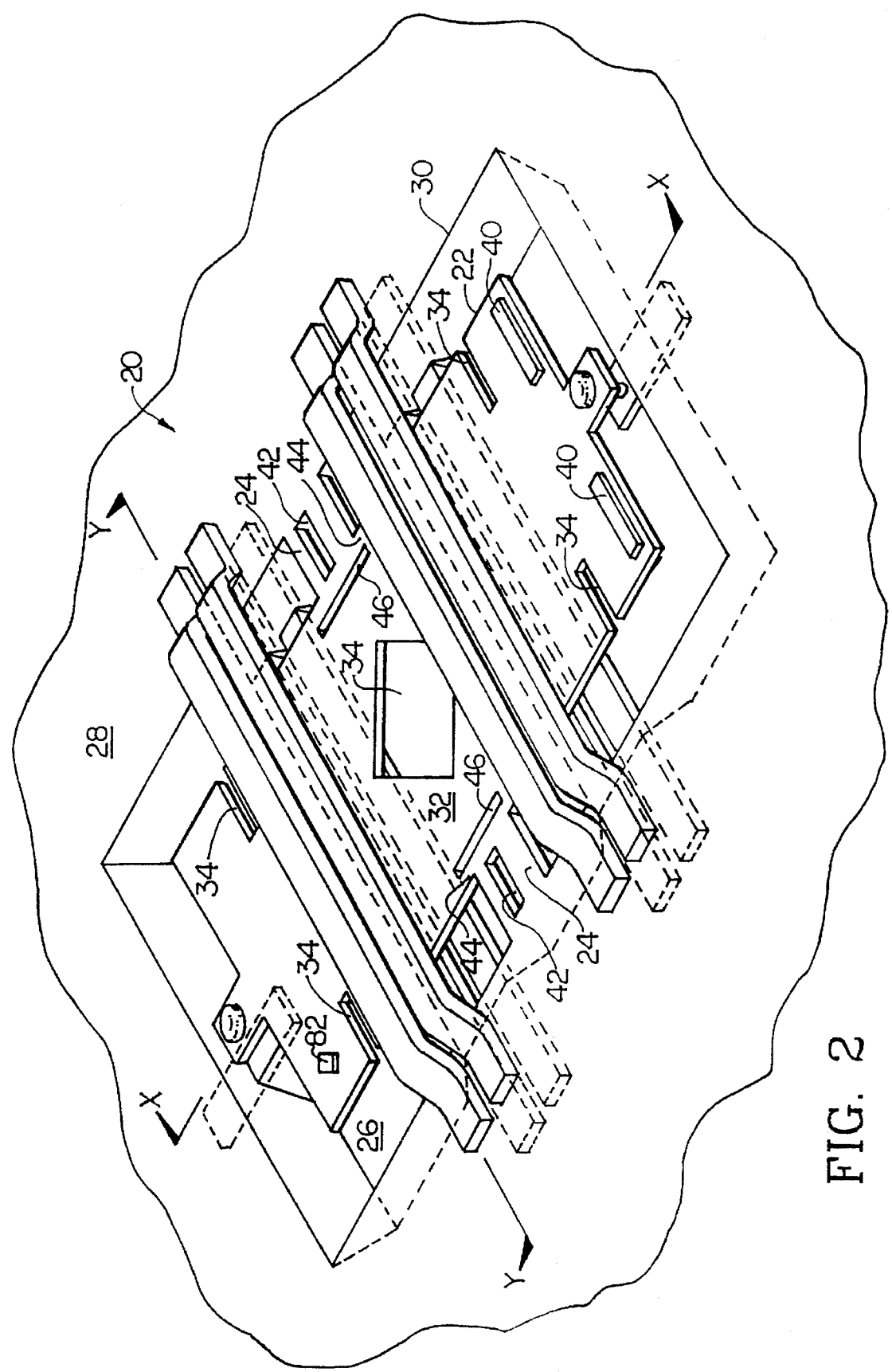
FIG. 2 is a perspective view of a micromechanical accelerometer according to the invention.

Referring to FIGS. 1 and 2, a micromechanical accelerometer 20 comprises a transducer element 22 which is suspended by a pair of flexible linkages 24 above a void 26 in a mass of silicon 28. The silicon mass 28 is preferably an N-type epitaxialy grown layer on a base of monocrystalline N-type silicon. Selective doping and etching yields P-type transducer element 22 and flexible linkages 24 freely suspended in a frame 30 above void 26.

Processes for selective doping and etching of silicon mass 28 are described in the above-referenced applications.

Transducer element 22 includes a substantially symmetrical plate 32, torsionally supported by linkages 24, doped P-type and selectively etched free from silicon mass 28. A plurality of etch facilitating slots 34 are formed through plate 32 to speed up and assure complete undercutting of plate 32 during formation of void 26 and release of element 22 from silicon mass 28. The pair of flexible linkages 24 have first ends 36 connected to silicon frame 30 and second ends 38 connected to plate 32. The plate 32 is completely detached from silicon mass 28 and free to rotate about an axis formed by the flexible linkages 24. If the flexible linkages 24 are created by selectively P-type doping areas defining the linkages 24 and plate 32, the resulting transducer element 22 is effectively isolated from silicon mass 28 by the P-N junction between P-type flexure and N-type mass 28 created by doping the flexure and plate areas.

Alternatively, dielectric isolation of transducer element 22 can be achieved by growing an oxide or silicon nitride layer or combination thereof or the like over the N-type mass 28, as described in the referenced applications, to form flexible linkages thereon. Dielectric isolation will provide much lower capacitance between the plate 32, flexible linkages 24 and the remainder of mass 28 permitting a device having a significantly greater signal-to-noise ratio than a similar device having P-N junction isolation of plate and flexures.

Plate 32 is substantially rectangular, being a typical size 300×600 microns, and has a proof mass or weight 40 disposed near an end 41. Weight 40 is a two-piece asymmetric mass, being disposed at only one end of plate 32 remote from linkages 24. The weight 40 is provided by plating or otherwise depositing a surface metalization near end 41 of plate 32. Preferably, weight 40 is located beyond electrodes, discussed hereinafter, to minimize the effects of temperature, which can cause the metallized end to bow and introduce inaccuracies into the device. The metalization is done when other structures of the accelerometer are metallized. Weight 40 provides sensitivity to acceleration forces perpendicular to the plate 32.

Figure 3A:
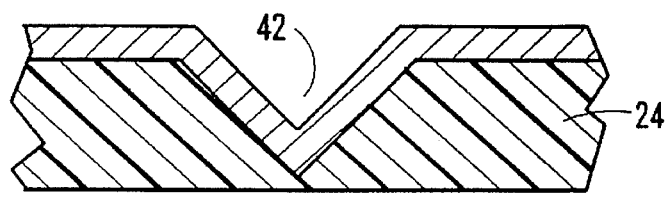
FIG. 3A is a cross-section of flexible linkage grooves formed by anisotropic etching.
Figure 3B:
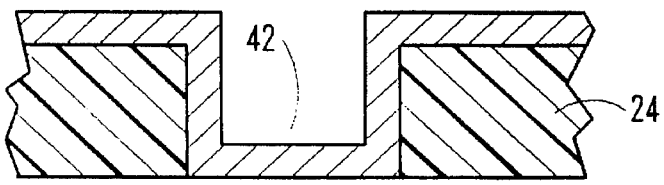
FIG. 3B is a cross-section of flexible linkage grooves formed by plasma etching.

Flexible linkages 24 attach plate 32 to silicon mass 28. The linkages 24 are provided with depressions or grooves 42 which give the linkages added strength against buckling or bending while maintaining desired torsional flexibility. Depressions or grooves 42 may be etched into linkages 24 anisotropically, in which case they have a "V" cross-section, as illustrated in FIG. 3A. Alternatively, the depressions for grooves 42 may be formed in linkages 42 by other processes known in the art, such as plasma etching which provides a U-beam configuration as illustrated in FIG. 3B. After forming the depressions for grooves 42, a shallow selective P-type diffusion defining flexible linkages 24 also diffuses into the depressions and creates the "V" or "U" structure that survives the final etch.

Each of the flexible linkages 24 has a tension relief beam 44, located proximate to its second end, formed by allowing etching of a slot 46 through plate 32 during the final etch to free plate 32. The beams 44 relieve tension created by boron doping of the linkages 24 and plate 32. Boron doping results in the etch resistance of structural elements, however, it also reduces lattice spacing of the doped P-type structures with respect to the surrounding N-type silicon mass 28. The P-type structure tries to shrink when undercut, but is restrained by thicker mass 28, putting the flexible linkages 24 in tension. The lattice spacing reduction coupled with a boron concentration gradient also results in a slight bow in plate 32, which can be compensated for by means discussed hereinafter. Tension in the flexure or flexible linkages, is relieved by etching slots 46 through the plate 32. As opposed to unrelieved linkages, the tension relief provided by beams 44 results in linkages which are less stiff, enhancing the sensitivity of the device. The beams 44 created by slots 46 are trimmable in a manner which permits tuning of the resonant frequency of plate 32. Trimming of beams 44, such as by laser ablation of plate 32 to elongate slot 46, is described in the above-referenced application.

Figure 4A:
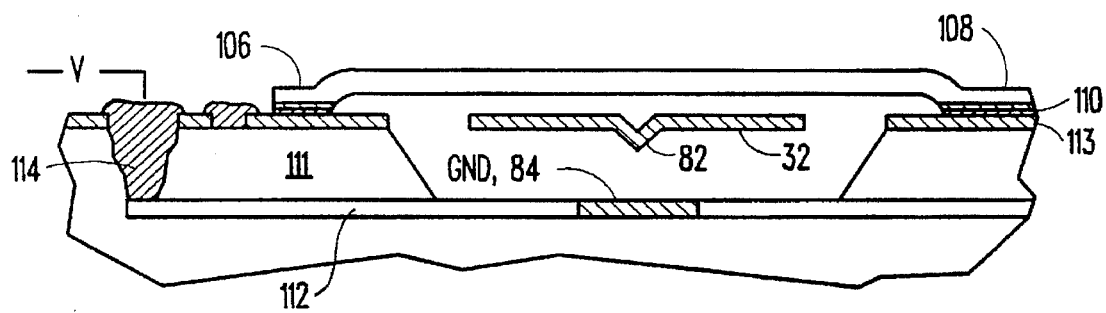
FIG. 4A is an expanded cross-section of the micromechanical accelerometer of FIG. 2 taken along a line Y—Y and showing a protuberant motion restraint or dimple.

To facilitate sensing of acceleration-induced rotation and re-balance torquing of plate 32, a plurality of electrodes are provided in the micromechanical accelerometer according to the invention. Symmetrical torquing and sensing of plate 32 is preferable and is provided by having paired upper and lower torquing and sensing electrodes as shown in FIG. 4. Four buried electrodes 48, 50, 52 and 54 are fabricated as doped P-type regions on the surface of an underlying N-type mass 49 on which the N-type silicon mass 28 is grown. The P-type integral electrodes 48, 50, 52 and 54 are positioned to lie beneath plate 32. Four bridge electrodes 56, 58, 60 and 62 span transducer element 22 as photolithographically produced metalizations over resist layers above plate 32, as illustrated in FIG. 4A, in paired alignment with buried electrodes 48, 50, 52 and 54, respectively.

Figure 4B:
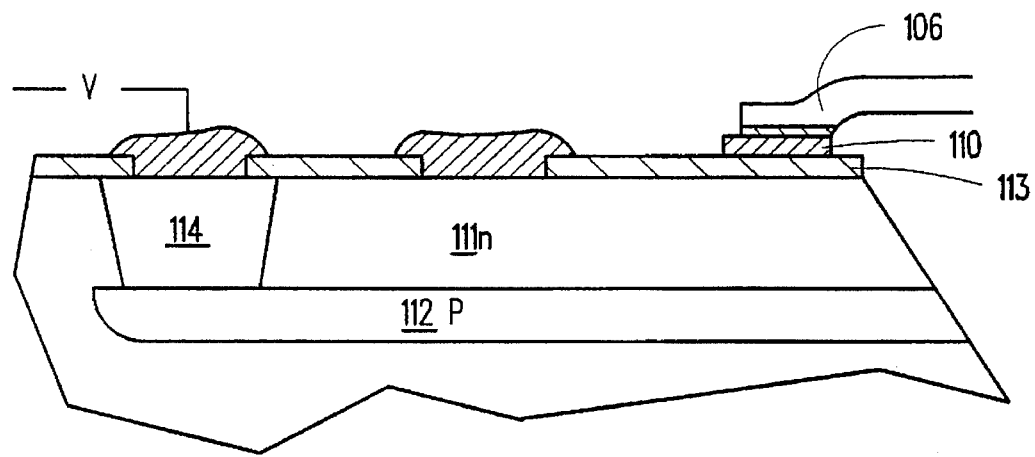
FIG. 4B is an expanded cross-section of an electrically isolated bridge electrode landing.
Figure 4:
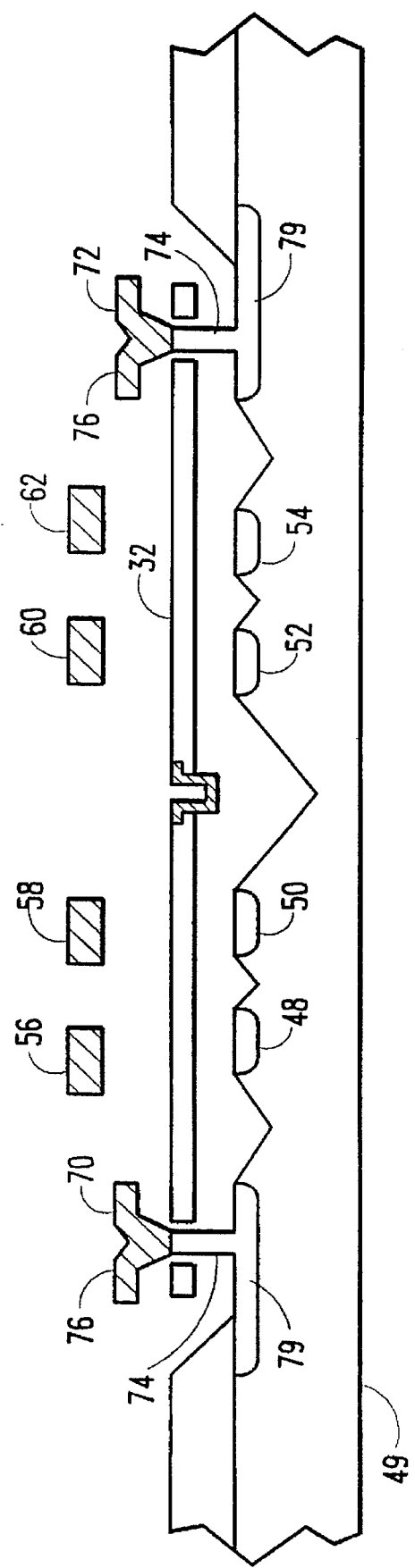
FIG. 4 is a cross-section view of the micromechanical accelerometer of FIG. 2 taken along a line X—X and showing a toadstool motion restraint.
Figure 5A:
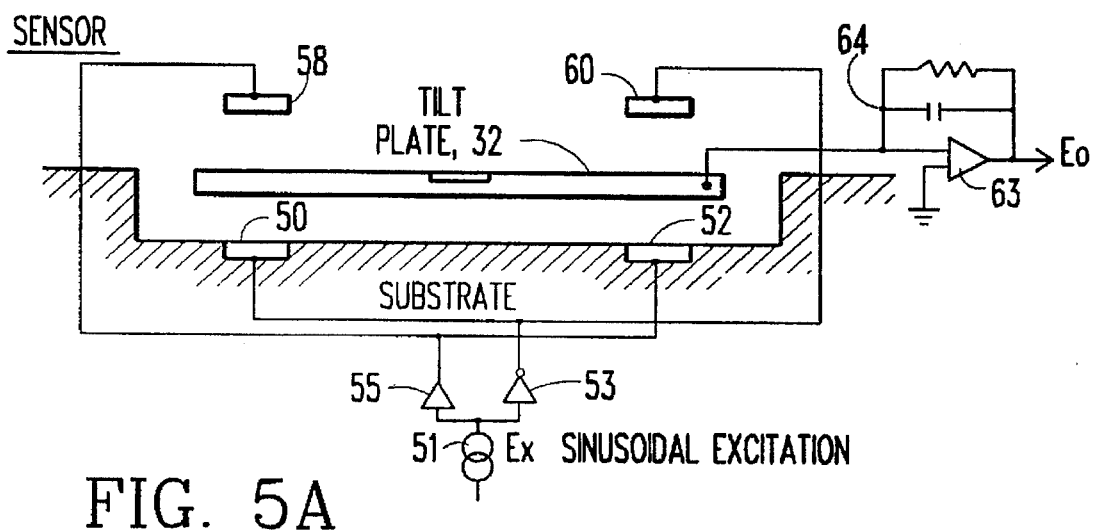
FIG. 5A is a diagrammatic representation of a sensor electrode configuration of a micromechanical accelerometer according to the invention.
Figure 5B:
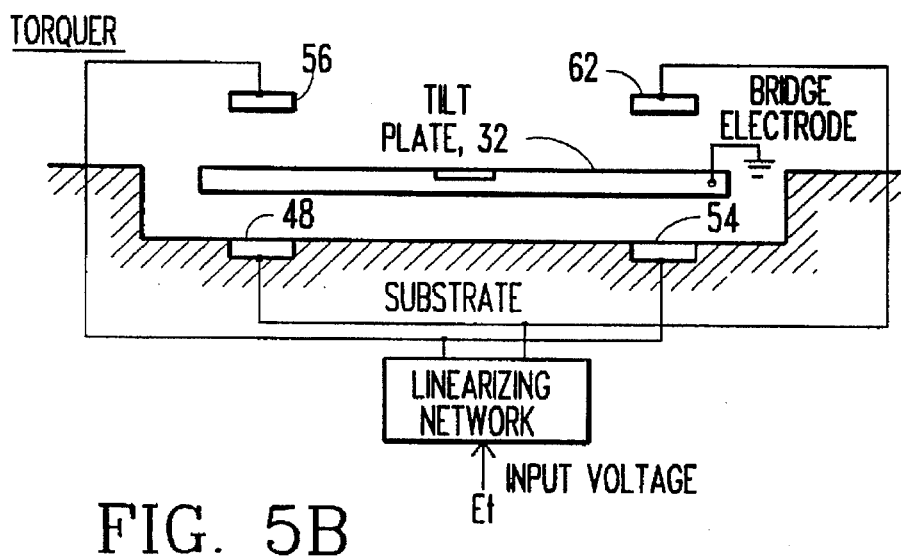
FIG. 5B is a diagrammatic representation of a torquer electrode configuration of a micromechanical accelerometer according to the invention.

As illustrated in FIGS. 4, 5A and 5B, an inner pair of integral electrodes 50, 52 and an inner pair of bridge electrodes 58, 60 are used as sense electrodes, while an outer pair of integral electrodes 48, 54 and an outer pair of bridge electrodes 56, 62 are used as torque electrodes.

Differential capacitance change, resulting from positional tilt of the plate 32 due to accelerations, is sensed by both pairs of sense electrodes 50, 52, 58 and 60. Each pair of sense electrodes is electrically driven 180° out-of-phase with respect to the other pair with a 100 kHz frequency signal so that a net current out of the plate is obtained when the plate 32 tilts. The magnitude and phase of the current from plate 32 is amplified and gives a measure of the angular position of the plate 32. For this purpose electrodes 50 and 60 are driven from a source 51 through inverting amplifier 53 while electrodes 52 and 58 are driven through non-inverting amplifier 55. Plate 32 is connected to an amplifier 63 having a feedback network 64. When the plate 32 is centered (i.e., not tilted by acceleration), capacitances between the plate 32 and electrodes 50, 52, 58 and 60 are equal and there is no net current at the summing junction of amplifier 63, connected to the plate 32 and thus no output voltage. When plate 32 tilts, as a result of acceleration, the capacitances between the plate 32 and electrodes 50, 52, 58 and 60 are unbalanced. A net current is present at the summing junction of amplifier 63 resulting in an AC voltage output proportional to the change in differential capacitance and thus tilt. Feedback network 64 allows the input of amplifier 63 to operate at a virtual ground. Amplifier 63 and feedback network 64 are preferably fabricated on the instrument chip. This configuration provides minimum capacitive loading on the output node, reduces parasitic capacitance and noise pickup and, therefore, results in a higher output signal-to-noise ratio. Access to the amplifier 63 is via a metalization to a reverse biased P-type flexible linkage 24.

Referring now to FIG. 5B, since the accelerometer is to be operated closed loop, positional information is fed to a control loop which generates a voltage proportional to tilt angle. Another set of electrodes, outer pair of buried electrodes 48, 54 and outer bridge electrodes 56, 62 are used to apply a linearized analog of this voltage, differentially to the plate 32, electrostatically torquing the plate to restrain it against tilt.

A configuration of an accelerometer according to the invention may be implemented using only buried or integral electrodes without opposing bridge electrodes. Such an embodiment is illustrated in an electrical circuit model shown in FIG. 6.

Since the force on a capacitor is proportional to the square of the applied voltage, it is desirable to linearize the net torque as a function of the output voltage proportional to tilt angle before torquing the plate 32 by applying voltage to buried torque electrodes.

Linearization is done by using the following relationships:

net torque: $T = k[V1^2 - V2^2]$ where V1 is the voltage applied to one torque electrode (or set of electrodes acting in the same direction), V2 is the voltage applied to the other electrode, and k is a constant depending on the geometry, the dielectric constant, and the gap between the tilt plate and the torque electrode. Let:

$V1 = B + E_t$ $V2 = B - E_t$ where B is a fixed bias that holds the plate centered in the absence of acceleration. Then combining these three, $$T = k[(B+E_t)^2 - (B-E_t)^2]$$
$$= k[(B^2 + 2E_tB + E_t^2) - (B^2 - 2BE_t + E_t^2)]$$
$$= k4BE_t$$

Figure 6:
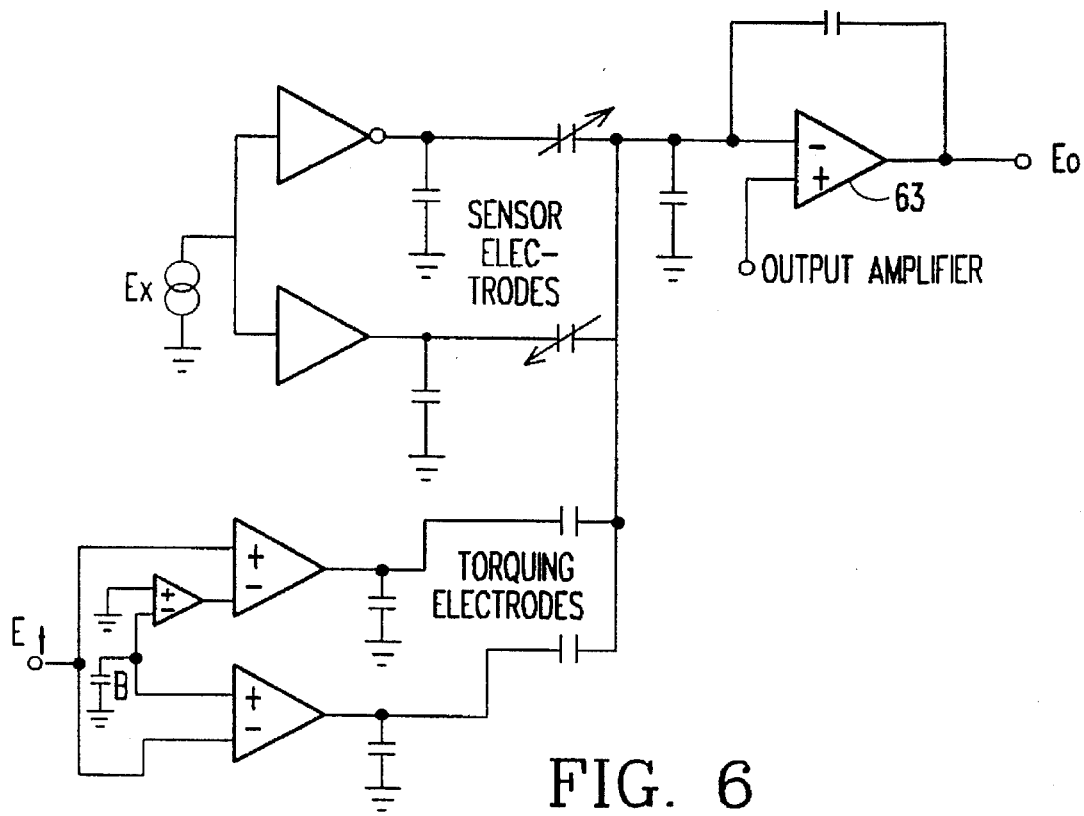
FIG. 6 is a circuit diagram for a torque system for use without opposing electrodes.

The torquing circuit shown in FIG. 6 implements the above algorithm, resulting in a linear relationship between the applied voltage $E_t$ and net torque T applied to the tilt plate. The bias voltage also serves to bias the P-N junction of the integral electrodes appropriately.

Figure 7:
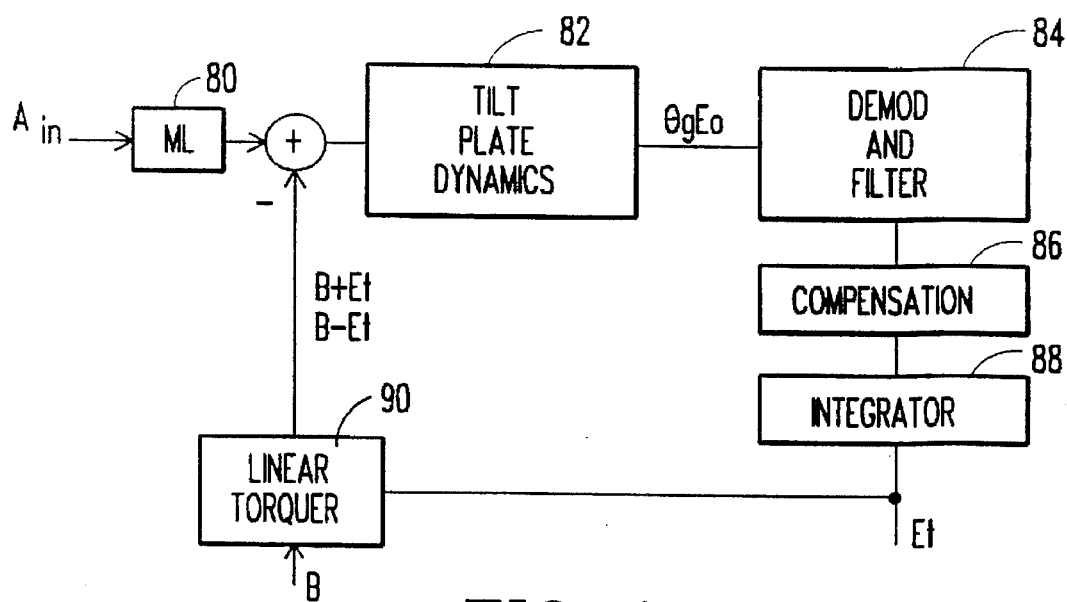
FIG. 7 is a diagrammatic representation of accelerometer electronics having a feedback loop for rebalance.

The circuit configuration of FIG. 6 is used in a feedback loop to rebalance the tilt plate. A functional block diagram of the loop is shown in FIG. 7. An acceleration $A_{in}$ impressed on the instrument results in a torque applied to the transducer which is a function of a plate pendulous mass and a pendulum length, represented as 80 in FIG. 7. Tilt angle of the plate is measured as a differential capacitance as discussed hereinbefore, by what is functionally an angle sensor 82. The output $E_O$ of the angle sensor 82, is demodulated 84 with respect to the 100 kHz excitation signal of the sensor. The DC output of the demodulator is then passed through servo compensation 86 to an integrator 88. The output of the integrator 88 is fed back to the torque network 90 previously described, which serves to drive the tilt plate back so as to zero the output angle Θ. Any acceleration, $A_{in}$, will apply a torque to the tilt plate equal to $A_{in}*M*L$, where M is the pendulous mass and L the pendulum length. The loop then serves to rebalance the tilt plate, resulting in a voltage on the integrator output $E_t$. This voltage, required to hold the plate against the acceleration torque is the instrument output in volts, and is proportional to the input acceleration for a perfectly linear torquer.

It is advantageous to have integral and bridge electrodes opposed on the top and bottom of plate 32. With either sense or torque electrodes on only one side of the plate there is a net force between the plate 32 and the substrate 28 which tends to pull the plate toward the substrate. By using two pairs of opposing electrodes, one pair on each side of the tilt plate, the electrodes can be connected as indicated in FIGS. 5A and 5B to cancel out this force. Furthermore, because of the differential nature of such a configuration the output of the sense electrodes and the torque applied by torque electrodes, as functions of the angle of plate 32, will be linearized.

Figure 4C:
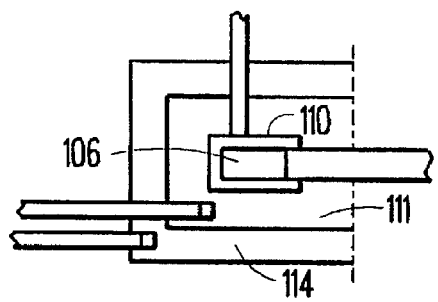
FIG. 4C is a top view of the bridge electrode landing of FIG. 4B having surface metalizations to effect a driven shield.

It may be desirable to further enhance the integrity of signals derived using bridge electrodes, as illustrated in FIGS. 4-4C and effecting driven shields thereunder. Each bridge electrode has opposite landings or terminations represented by landings 106, 108 illustrated in FIGS. 4A, 4B and 4C, disposed on the silicon frame. The electrode landings are formed over a metalization layer 110. An oxide layer 113 provides DC electrical isolation but capacitance to the substrate is still large. In some cases (i.e., where the bride electrodes are used at high impedance for signal pickoff instead of excitation from a low impedance source) this capacitance adversely affects the signal.

The construction illustrated in FIGS. 4A, 4B and 4C provides a driven shield to effectively neutralize this capacitance. As shown in FIG. 4C, electrical isolation region 111 is provided under the landing of the signal pickoff bridge. In the discussion to follow it is understood that both regions 111, on both sides of the bridge, are treated the same electrically. Region 111 is DC-isolated by the surrounding P regions 112, 114, which effect an isolating floor and wall, respectively. Region 111 is driven at the same (or nearly the same) potential as electrode landing 106 and the capacitance between them is thus electrically neutralized, maximizing the signal-to-noise ratio at the point of pickoff.

The extent of rotation of plate 32 about the axis formed by flexures 24 may be limited by the implementation of mechanical stops, the function and fabrication of which is discussed in detail in the referenced application entitled MOTION RESTRAINTS FOR MICROMECHANICAL DEVICES. Such mechanical stops are illustrated in FIG. 4 which shows a side sectional view of an accelerometer according to the invention including "toadstool"-shaped stops 70, 72.

Stops 70, 72, each have a post 74 and cap 76 disposed thereon. The posts 74 are disposed within circular apertures 78 in plate 32 (best viewed in FIG. 1). Posts 74 must be fabricated of such dimensions such that plate 32 moves freely with respect thereto and so as to account for any bowing of plate 32 due to crystal lattice spacing reduction resulting from boron doping. The bottoms of posts 74 are each anchored to buried or cantilevered electrodes 79 which are maintained at the same potential as plate 32.

Alternatively, as shown in FIG. 4A, a micromechanical accelerometer according to the invention may include dimples 82 disposed at the extreme ends of plate 32 to effect mechanical motion restraint. Such dimples 82 would be disposed protruding from beneath plate 32, above a grounded buried or cantilevered electrode 84. Like the toadstool stops, dimples must be fabricated of such a dimension so as to account for bowing of plate 32 while effecting motion restraint and should be applied symmetrically relative to the plate.

Although asymmetry of the tilt plate is shown hereinbefore as resulting from a plated mass disposed thereon, it should be appreciated that such asymmetry may be obtained by extending one end of the plate 32.

Although, in the embodiments discussed herein, the inner electrodes performed sensing and other electrodes performed torquing, one of ordinary skill in the art may appreciate that these functions could be interchanged so that outer electrodes sensed while inner electrodes provided torque.

Although toadstool stops and dimples are discussed as motion restraints in embodiments of an accelerometer according to the invention, other motion restraining techniques may be implemented, such as cantilevered stops.

While a single micromechanical accelerometer is described and illustrated herein, it will be appreciated that a plurality of devices as described can be used in conjunction in a redundant transducer and that a plurality of transducer elements can be implemented in a single mass of silicon working in conjunction to effect any of various transducer functions.

Figure 8A:
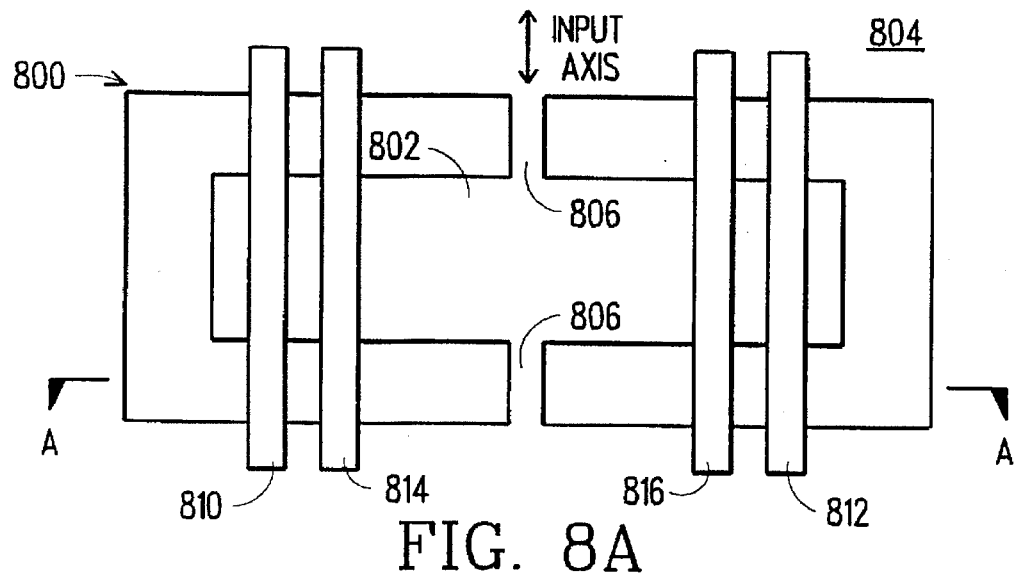
FIG. 8A is a top view of an angular micromechanical accelerometer structure.
Figure 8B:
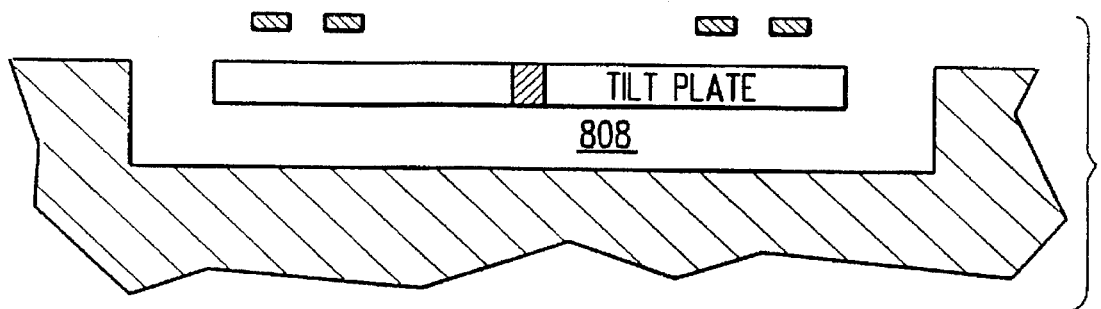
FIG. 8B is a side section view, taken along line A—A of FIG. 8A.

Referring now to FIGS. 8A and 8B, an angular accelerometer 800 is fabricated as a substantially rectangular plate 802 attached to a mass of silicon 804, by a pair of flexible linkages 806. As with the embodiments described hereinbefore, the plate 802 and flexible linkages 806 are formed by etching a void 808 in the mass of silicon 804 so that the plate 802 is freely suspended thereabove. The flexible linkages effect an input axis coaxial therewith, about which the plate 802 rotates in a limited manner. The flexible linkages or flexures 806 may have grooves disposed therein as discussed and in the illustrative embodiment are fabricated in the same etching process that yields the plate 802. The flexures 806 are fabricated having sufficient stiffness to substantially prevent the plate 802, which is configured to be capable of limited motion about the input axis created by the flexible linkages 806, from engaging the bottom of void 808 as the plate rotates about the linkages. If the flexures are made sufficiently stiff to prevent the plate from bottoming in the void in the presence of an expected maximum angular acceleration, the tilt angle is a direct measure of the angular acceleration.

The plate 802 is substantially symmetrical with respect to the flexible linkages 806. In the illustrative embodiment, a high degree of symmetry and uniformity is desirable to yield a balanced plate. A large proof mass is desirable as well. The large proof mass can be implemented with a large area structure, alternatively, the large proof mass can be implemented by fabricating masses, such as metallizations, onto the plate as discussed hereinafter. Large area device fabrication techniques, such as described in commonly owned U.S. Pat. No. 5,129,983 entitled METHOD OF FABRICATION OF LARGE AREA MICROMECHANICAL DEVICES, which is incorporated herein by reference, can be used to fabricate a large area symmetrical plate having a large proof mass.

In the illustrative embodiment of FIGS. 8A and 8B, the plate 802 comprises a proof mass that is a substantially balanced 10–20 micron thick and approximately 0.6 mm wide by 1.2 mm long silicon structure. In the presence of angular acceleration, the plate 802 will tend to tilt because of its inertia. The inertia of the large proof mass plate is great enough to provide the required angular acceleration sensitivity.

Sensing of the angular tilt is done capacitively by configuring the plate 802 as a first plate of a capacitor and using a plurality of buried or bridge electrodes, described in the referenced applications, as the second plate of the capacitor. As illustrated in FIG. 8A, a first pair of bridge electrodes 810, 812 is disposed proximate extreme ends of the plate 802. The first pair of bridge electrodes 810, 812 act as sense electrodes, capacitively sensing displacement of the plate 802. The capacitance represented by the distance between each of the sense electrodes 810, 812 and respective ends of the plate 802 provides a differential readout. Circuitry (not shown) senses the difference between a first capacitor formed by a portion of the plate 802 and one sense electrode 810, and a second capacitor formed by another portion of the plate 802 and the other sense electrode 812. The difference between the first and second capacitors yields a substantially linearized output from the angular sensor 800.

In the embodiment illustrated in FIGS. 8A and 8B, a second pair of bridge electrodes 814, 816 is used as electrostatic torque electrodes. The torque electrodes, each one disposed intermediate to one of the sense electrodes 810, 812 and the flexible linkages 806, electrostatically torque the plate 802 to rebalance. With the tilt plate electrostatically torqued to rebalance, the tilt angle represents an error signal and the voltage required to rebalance the tilt plate 802 is a measure of the angular acceleration.

Figure 9:
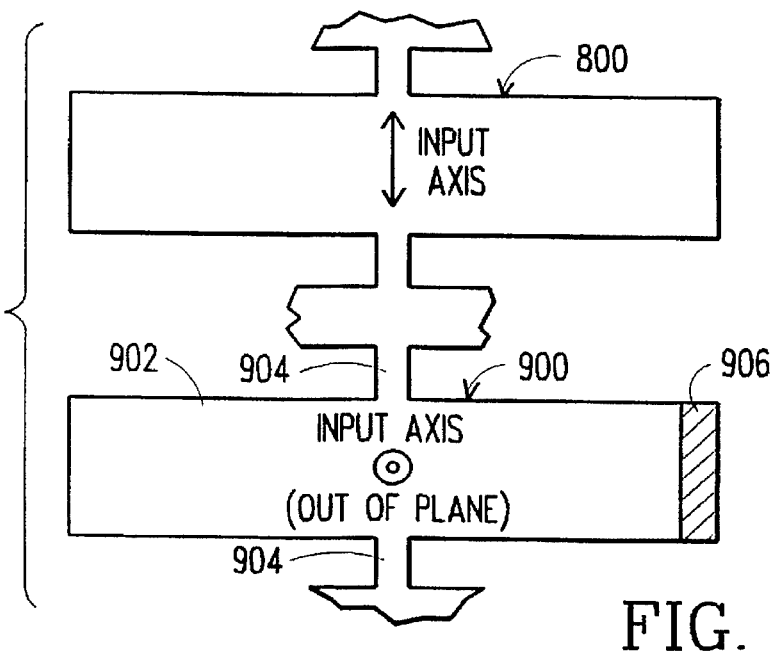
FIG. 9 is a diagrammatic view of an angular micromechanical accelerometer paired with an adjacent linear accelerometer.

A major difficulty in designing a practical angular accelerometer is that any pendulous unbalance of the tilt plate, such as unbalance caused by asymmetry, results in a spurious output from the angular accelerometer. The angular accelerometer 800 described hereinbefore, having matching pendulosity when completely balanced, is not responsive to acceleration into the plane of the tilt plate 802. The angular accelerometer 800 is sensitive to out-of-plane acceleration causing rotation of the plate 802 about its input axis. It is desirable in a highly sensitive and accurate system to eliminate any error in the angular rate measured that is attributable to linear acceleration. Thus, referring now to FIG. 9, the angular accelerometer according to the invention includes a linear accelerometer 900 adjacent to the angular accelerometer on the same mass of silicon.

The second accelerometer 900 is a linear accelerometer fabricated in the same mass of silicon and comprises a second tilt plate 902 supported by a second set of flexures 904 above a corresponding void. The second accelerometer 900 has a pendulous mass 906 fabricated thereon proximate to an end thereof, such as by deposition of a metallization. The pendulous mass 906 shifts the center of gravity of the second tilt plate 902 and effects an asymmetrical transducer comprised of an unbalanced plate. The unbalanced plate 902 has an input axis that is normal to or out of the plane of the tilt plate 800 of the angular accelerometer described hereinbefore making the device sensitive to input accelerations that are in the plane of the tilt plate 800 of the angular accelerometer, providing a device sensitive to linear acceleration.

The linear acceleration applied to the unbalanced plate 902 resulting in rotation of the plate 902, is sensed by capacitive sensing using buried and/or bridge electrodes as described hereinbefore and in the referenced applications.

The substantially balanced angular accelerometer 800 and adjacently disposed linear accelerometer 900 are fabricated on the same semiconductor chip which is approximately 2 mm by 4 mm. The adjacent devices each occupy an area approximately 1 mm by 1.2 mm and are spaced apart approximately 1 mm. The output of the angular accelerometer 800 is received by circuitry, which also receives the output from the linear accelerometer 900. The output of the angular accelerometer is corrected for linear acceleration, to compensate for any unbalance and/or to remove the affects of linear acceleration, by adding or subtracting the properly scaled linear accelerometer output from the angular accelerometer output.

Figure 10:
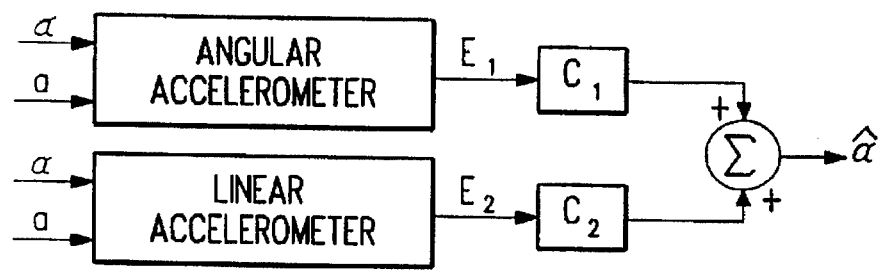
FIG. 10 is a block diagrammatic representation of processing output from the linear and angular accelerometers.

Referring now to FIG. 10, forces including angular acceleration ($\alpha$) and linear acceleration (a) are impressed on the transducers, which are responsive as described hereinbefore. The angular accelerometer is responsive, in accordance with its particular sensitivity, to the forces impressed thereon which results in an output voltage (E1) representative of the applied acceleration. Similarly, the linear accelerometer, which is subject to the same input as the angular accelerometer but has different sensitivity, effects generation of an output voltage (E2) representative of the acceleration applied thereto. The output voltages E1 and E2 from the angular accelerometer and linear accelerometer respectively, are defined as:

$$E_1 = G_1[P_1 a + I_1 \alpha] \quad (1)$$

$$E_2 = G_2[P_2 a + I_2 \alpha] \quad (2)$$

wherein, $E_1$=output voltage associated with the angular accelerometer;

$E_2$=output voltage associated with the linear accelerometer;

a=input linear acceleration;

$\alpha$=input angular acceleration;

G=transfer function relating input acceleration and output voltage;

P=scale factor for linear acceleration;

I=scale factor for angular acceleration;

$$\begin{bmatrix} P_1 & I_1 \\ P_2 & I_2 \end{bmatrix} \begin{bmatrix} a \\ \alpha \end{bmatrix} = \begin{bmatrix} E_1/G_1 \\ E_2/G_2 \end{bmatrix} \quad (3)$$

$$\begin{bmatrix} \hat{a} \\ \hat{\alpha} \end{bmatrix} = \frac{\begin{bmatrix} I_2 & -I_1 \\ -P_2 & P_1 \end{bmatrix} \begin{bmatrix} E_1/G_1 \\ E_2/G_2 \end{bmatrix}}{P_1 I_2 - P_2 I_1} \quad (4)$$

$$\hat{\alpha} = \frac{\frac{P_2 E_1}{G_1} - \frac{P_1 E_2}{G_2}}{P_2 I_1 - P_1 I_2} \quad (5)$$

In practice, the $P_1 I_2$ term in the denominator is usually small enough to neglect.

Figure 11:
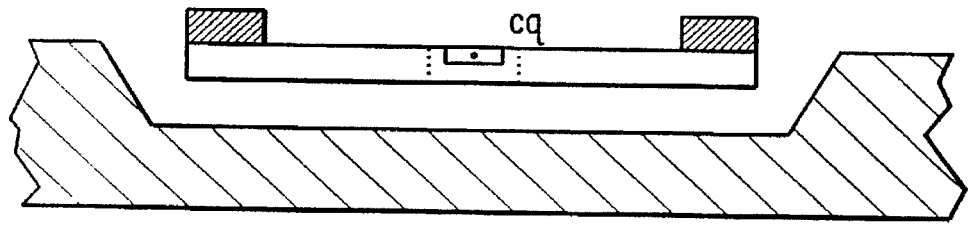
FIG. 11 is a side view of a plate of a transducer having trimmable weights disposed at opposite ends thereof to effect a balanced proof mass.

The angular accelerometer, as discussed hereinbefore, should be quite uniform and symmetrical, while effecting a large proof mass. In order to trim the plate 802 for complete balance, a metal film can be deposited on the plate and selectively removed by laser ablation. Similarly, as illustrated in FIG. 11, the plate can be fabricated as a thin plate having weights to increase sensitivity, such as tungsten metallizations, disposed proximate to opposite ends thereof. The tungsten weights can be laser trimmed to balance the proof mass.

Figure 13:
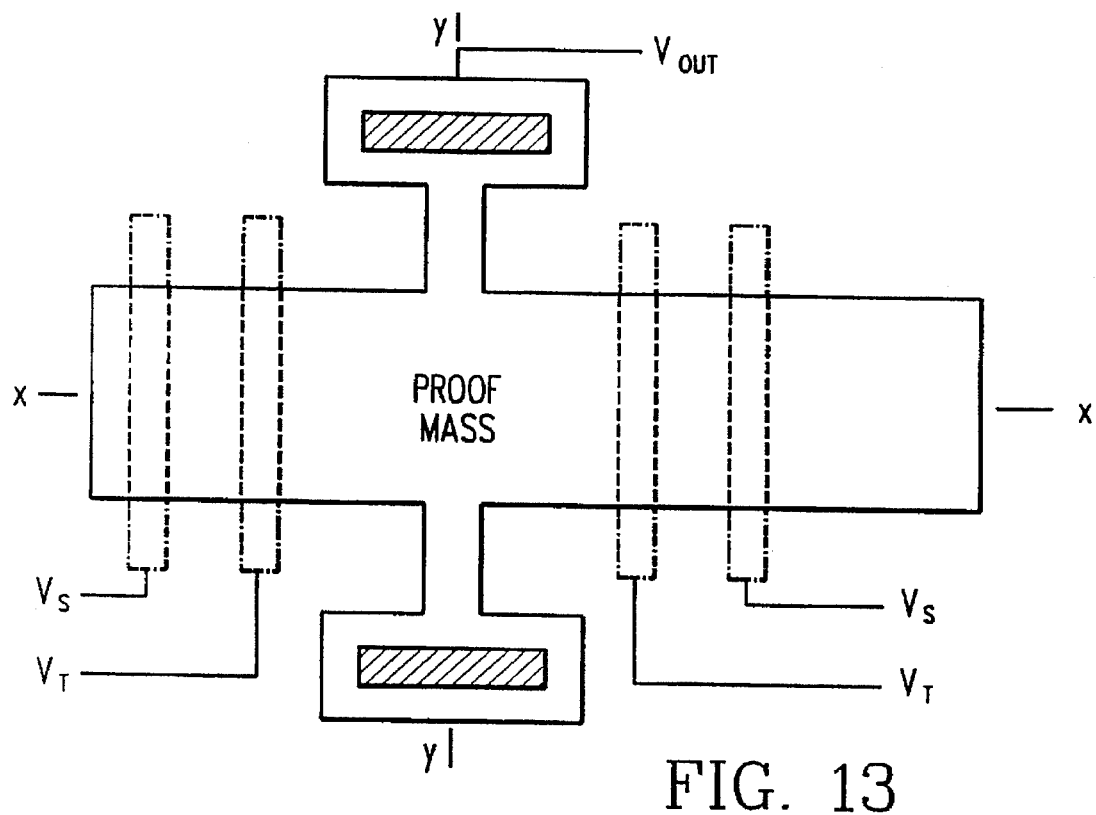
FIG. 13 is a plan view of a micromechanical accelerometer fabricated in accordance with the process depicted in FIGS. 12A–12H.

Alternative methods can be used for fabricating an angular accelerometer with linear compensation. As illustrated in FIGS. 12A–12G, a non-monolithic sandwiching process, as described in U.S. Pat. No. 5,013,396 which is incorporated herein by reference, can be used to implement the structure according to the invention. FIG. 13 is a plan view of a device so implemented. A silicon substrate is first processed (FIGS. 12A–12C), a glass substrate is processed (FIGS. 12D–12F) and the silicon and glass are bonded and etched (FIGS. 12G–12H).

Figure 12A:
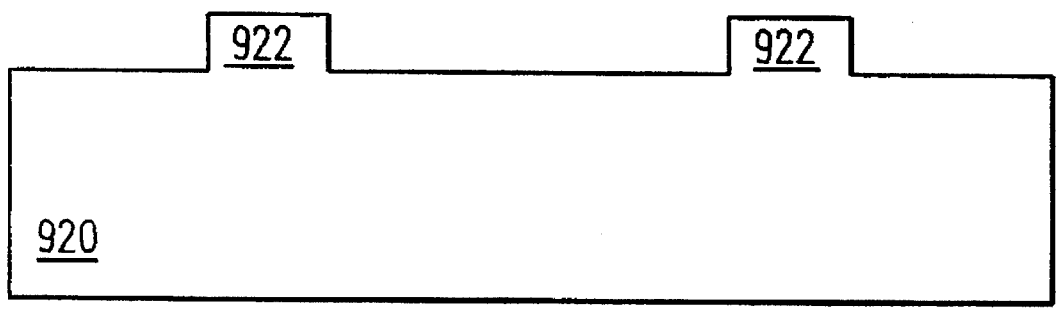
FIGS. 12A, 12B and 12C are sectional representations taken at Y—Y of FIG. 13, of initial silicon processing for fabricating transducers in an alternative sandwiched fabrication process.
Figure 12B:
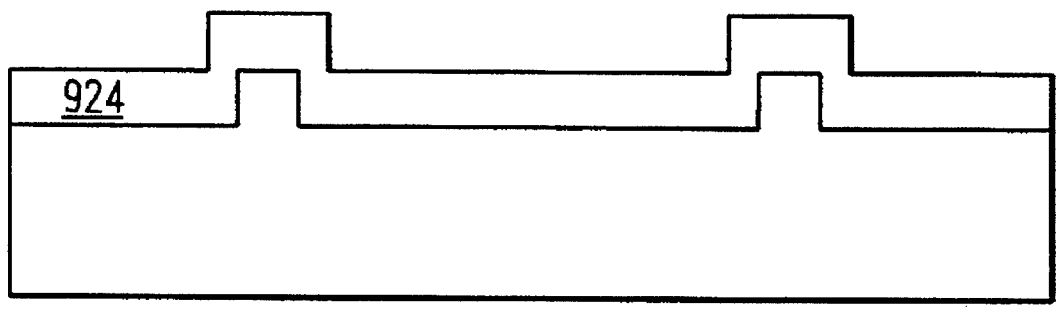
Figure 12C:
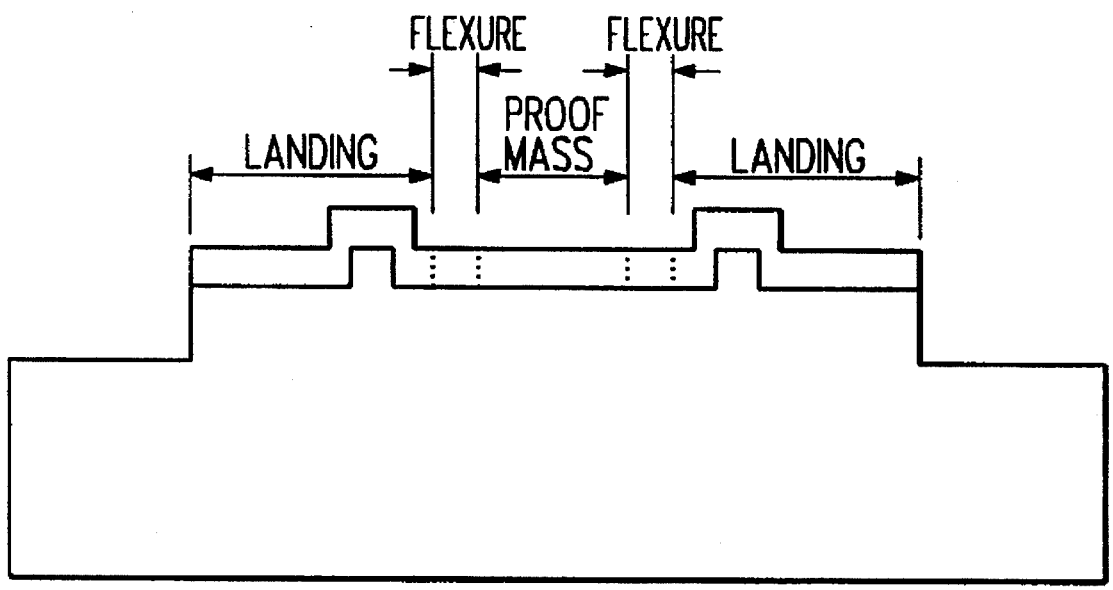

As illustrated in FIG. 12A, a silicon substrate 920 is processed via known photolithographic and etching techniques to form a plurality of mesas 922 thereon. The height of the mesas will eventually determine the electrode to proof mass spacing. The tops of the mesas will be the area of the silicon substrate that gets bonded to the glass. A boron diffusion is effected 924, as illustrated in FIG. 12B, to a depth of approximately 10 microns. The depth of this diffusion will determine the thickness of the proof mass and the flexures. The diffused substrate is etched via a reactive ion etch, to form what is ultimately the perimeter of the proof mass 926 and of the entire device, as illustrated in FIG. 12C.

Figure 12D:
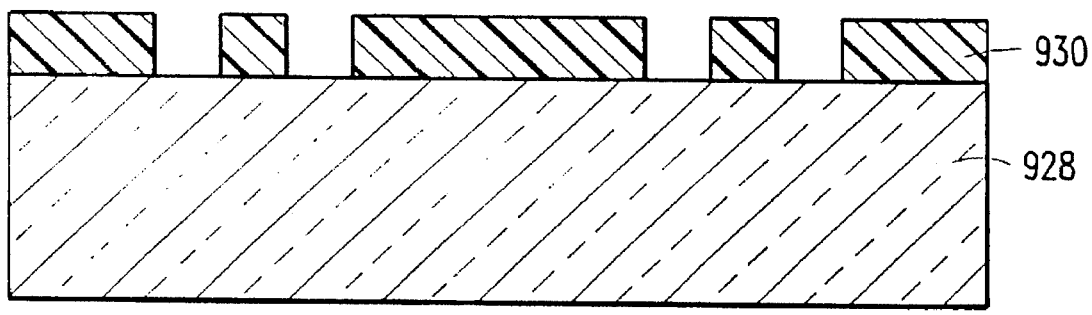
FIGS. 12D, 12E and 12F are sectional representations taken at X—X of FIG. 13, of initial glass processing steps for fabricating transducers in an alternative sandwiched fabrication process.
Figure 12E:
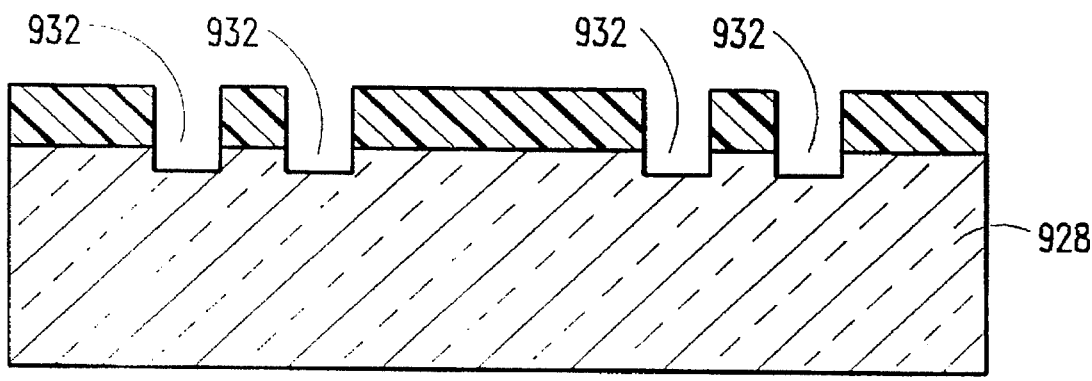
Figure 12F:
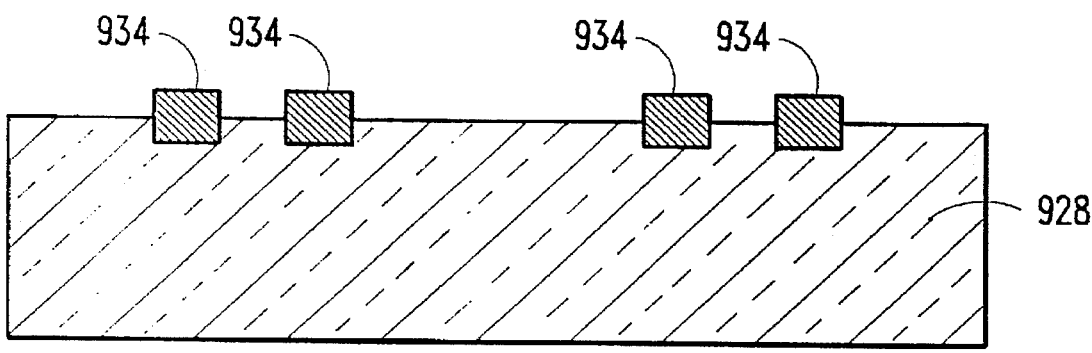
Figure 12G:
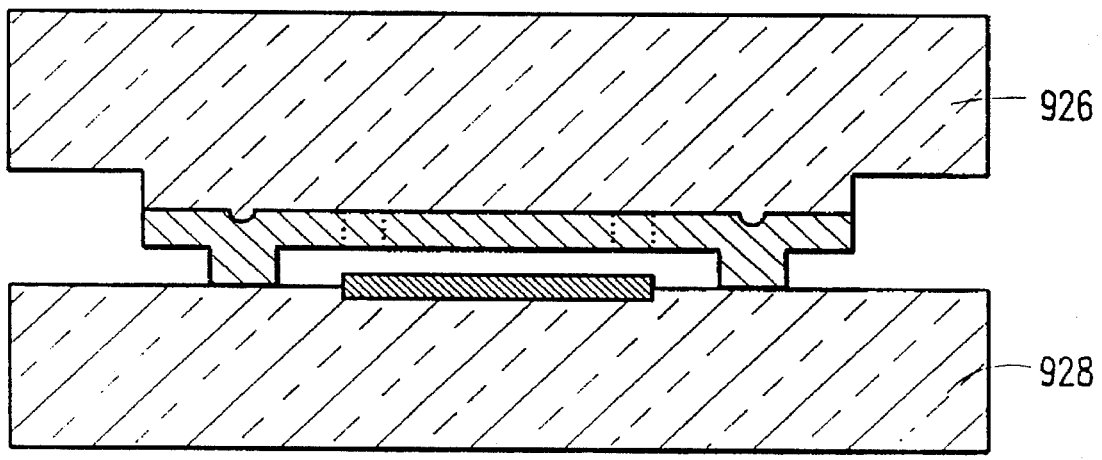
FIGS. 12G and 12H are sectional representations taken at Y—Y of FIG. 13, of device assembly for fabricating transducers in an alternative sandwiched fabrication process.

As illustrated in FIG. 12D, a glass substrate 928 is processed by patterning resist 930 thereon. Recesses 932 are etched in the glass 928 in portions unprotected by the resist, as illustrated in FIG. 12E. Metal 934 is deposited through the resist into the recesses. Subsequently the resist is lifted off leaving the surface metallizations 934, as illustrated in FIG. 12F. The metallizations 934 are effectively electrically isolated, as they are disposed in/on the glass.

Figure 12H:
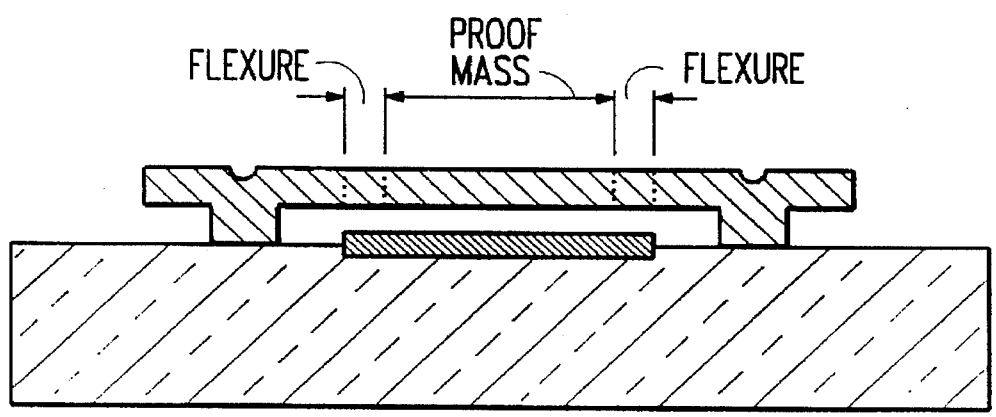

Referring now to FIGS. 12G and 12H, the device is assembled by inverting a processed silicon proof mass 926, aligning it with the processed glass portion 928 and bonding the proof mass to the glass via an anodic bond. The assembled structure is then etched in EDP to remove all the undoped, unwanted silicon structure, leaving the desired accelerometer structure, as illustrated in FIG. 12H.

It should be appreciated that various other fabrication methodologies can be practiced in implementing the angular accelerometer according to the invention.

While a silicon plate/proof mass is described having laser trimmable weights or metallizations, it should be appreciated that the balanced plate of high mass can be alternatively fabricated by the deposition of tungsten over a silicon proof mass and then patterning the tungsten using photolithography. Equivalently, nickel or gold can be selectively electroplated through a photoresist spacer layer.

Although bridge and/or buried electrodes, as described in the referenced application, are discussed for sensing and torquing the plate of the accelerometers herein, it should be appreciated that alternative torquing and sensing techniques can be implemented, including conductive traces disposed on the plate for magnetic force rebalancing of the proof mass, as described in co-pending commonly owned U.S patent application Ser. No. 07/807,726 entitled ELECTROMAGNETIC REBALANCE MICROMECHANICAL TRANSDUCER, which is incorporated herein by reference.

Although the invention has been shown and described with respect to an illustrative embodiment thereof, it should be understood by those skilled in the art that these and various other changes, omissions and additions in the form and detail thereof may be made therein without departing from the spirit and scope of the invention as defined in the following claims.

What is claimed is:

1. A semiconductor micromechanical device comprising:

at least one generally rigid structural element comprising a first boron diffusion region of a substrate, said first boron diffusion region having a first depth, and said at least one structural element mechanically free from said substrate;

at least one pair of flexures having first and second ends comprising a second boron diffusion region of said substrate, said second boron diffusion region having a second depth smaller than said first depth, a first end of said flexures mechanically free from said substrate and supporting said at least one structural element, a second end of said flexures connected to said substrate, said flexures controlling a drive or response motion of said at least one structural element; and at least one electrode for sensing or exciting said motion of said at least one structural element, said at least one electrode being located vertically proximate said at least one structural element.

2. The semiconductor micromechanical device recited in claim 1 further comprising a proof mass mounted on said at least one structural element.

* * * * *

UNITED STATES PATENT AND TRADEMARK OFFICE
CERTIFICATE OF CORRECTION

PATENT NO. : 5,635,739
DATED : June 3, 1997
INVENTOR(S) : Paul Greiff

It is certified that error appears in the above-identified patent and that said Letters Patent is hereby corrected as shown below:

On the title page,

Item [75], Inventors: "Paul Grieff" should read -- Paul Greiff --.

Column 9, line 47 (equation 1), "$E_1=G[P_1\alpha+I_1\alpha]$" should read -- $E_1=G_1[P_1\alpha+I_1x]$ --.

Signed and Sealed this

Fourth Day of May, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,635,739
DATED : June 3, 1997
INVENTOR(S) : Paul Greiff

It is certified that error appears in the above-identified patent and that said Letters Patent is hereby corrected as shown below:

On the title page,

Item [75], Inventors: "Paul Grieff" should read --Paul Greiff--.

This certificate supersedes Certificate of Correction issued May 4, 1999.

Signed and Sealed this

Sixth Day of July, 1999

Attest:

Q. TODD DICKINSON

*Attesting Officer*     *Acting Commissioner of Patents and Trademarks*